2,918,450
Patented Dec. 22, 1959

2,918,450

THERMAL STABILIZATION OF HALOETHYLENE POLYMERS

Robert L. Hudson, Midland, Mich., assignor to The Dow Chemical Company, Midland, Mich., a corporation of Delaware No Drawing. Application April 30, 1956
Serial No. 581,382

8 Claims. (Cl. 260—45.8)

This invention relates to the thermal stabilization of haloethylene polymers. More particularly it relates to new compositions based on haloethylene polymers and having improved thermal stability over prior known compositions.

It is known that haloethylene polymers, such as polyvinylchloride and the copolymers of vinyl chloride and vinylidene chloride, undergo appreciable degradation and darkening when heated during thermal fabrication operations when the fabricated articles are exposed for prolonged periods to elevated temperatures. That thermal sensitivity has seriously limited the applications in which haloethylene polymers may be employed. One of the common means for alleviating that degradation has been to employ certain additives as heat stabilizers in the polymer formulations. Those additives have consisted commonly of inorganic salts which were incompatible with the polymer, prohibiting the production of transparent articles, and were high melting or were organometallic compounds which were expensive and difficult to prepare and in some instances adversely affect the stability of the plasticizers that may be used in the formulation. The secondary requirements of a suitable heat stabilizer are manifold and varied. It must be compatible with and inert to all elements of the formulation, it must be odor-free and not impart a color to the formulation, and it is desirable that it be non-toxic. It should be insoluble in water and the common solvents. In view of the many requirements for a useful heat stabilizer, it is impossible for an investigator to predict the effectiveness of any particular compound with any degree of certainty and continuous search is being made for new and more effective heat stabilizers.

It is accordingly an object of this invention to provide a novel heat stabilized composition based upon haloethylene polymers.

It is a further object to provide such compositions which are thermally stabilized with metal-free stabilizers.

The above and related objects are accomplished by means of a formulation comprising a haloethylene polymer and stabilizing quantities of a glycidic ester having the general formula:

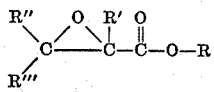

wherein R is an alkyl group having from 1 to 10 carbon atoms, R' is selected from the group consisting of hydrogen and alkyl groups containing from 1 to 10 carbon atoms, R" is an aryl group, and R''' is selected from the group consisting of hydrogen and aryl. Compositions thus prepared show outstanding stability to the degradative effects of elevated temperatures.

Any polymer containing halide groups in the carbon chain may be stabilized with the glycidic esters of this invention. As typical examples may be mentioned the polymers of vinyl chloride and of vinylidene chloride and the copolymers of vinyl chloride or vinylidene chloride with each other or with another monoethylenically unsaturated monomer, such as acrylonitrile and vinyl acetate. The polymers and copolymers consisting predominantly of vinylidene chloride are particularly sensitive to thermal exposure and are accordingly preferred.

The stabilizers useful in the compositions of this invention are certain glycidic esters falling within the above defined general formula. Although R may be any alkyl group or its equivalent, it is preferred for economic reasons and for ease of preparation of the compounds to limit the size of the group to one of from 1 to 10 carbon atoms. Also for practical reasons when R' is alkyl, it is preferred to have R' contain not more than 10 carbon atoms. It has been found that at least one of the substituents attached to the beta carbon atom must be aryl or a substituted aryl group, such as tolyl, methoxyphenyl, chlorophenyl, and the like. When both groups attached to the beta carbon atom are groups other than aryl, a rearrangement of the ester apparently occurs under certain conditions, resulting in a product having no utility as a heat stabilizer for haloethylene polymers. Thus, when R" is an aryl or substituted aryl group, it is possible for R''' to be hydrogen, aryl, or substituted aryl. R''' cannot be an alkyl group, however, since glycidic esters containing such groups have no stabilizing effectiveness for haloethylene polymers.

As a preferred class of compounds exhibiting especially effective stabilizing tendencies are those wherein R' is alkyl, R" is aryl and R''' is hydrogen.

Typical members of useful compounds falling within the scope of the invention are:

Ethyl-alpha-ethyl-beta-p-methoxyphenyl glycidate
Ethyl-beta-(p-tolyl) glycidate
Methyl-alpha-methyl-beta, beta-diphenyl glycidate The preparation of the compounds will be illustrated by the preparation of ethyl-β-(p-tolyl) glycidate. To a solution of 120 parts of p-tolualdehyde and an equimolar amount of ethyl alphachloroacetate in 300 parts of absolute ether was added portionwise an equimolar amount of dry, powdered sodium methoxide. The reaction was conducted under nitrogen and the temperature maintained at less than 10° C. After the addition was complete, the reaction mixture was stirred overnight at room temperature. The reaction mixture was poured into dilute acetic acid and the layers separated. The ether layer was washed with aqueous sodium bicarbonate and then with water and dried. The dried ether solution was evaporated and the residue was distilled under reduced pressure. The resulting ester had a boiling point of 109° C. at 0.65 mm. Hg.

The glycidic esters of this invention show stabilizing effectiveness when used in an amount of at least 0.5 percent by weight based on the weight of the polymer. It is preferred however to employ them in an amount of from 1 to 6 percent by weight. When more than 6 percent is used, the stabilizers become economically unattractive, no additional benefits accrue, and the physical properties of the composition suffer.

The glycidic esters of this invention are colorless liquids allowing the production of white and pastel colored articles as well as transparent articles. The esters show greater stabilizing effectiveness toward compositions based upon haloethylene polymers than any previously known completely organic stabilizers. Because of their organic nature they are capable of greater compatibility with the polymers than the inorganic or organo-metallic stabilizers.

The stabilizers of this invention may be employed with the other common additives used in haloethylene polymer formulations without any adverse effects resulting therefrom. Typical of such other additives are light stabilizers, fillers, pigments, and dyes.

The effectiveness and advantages of the glycidic ester thermal stabilizers of this invention will be more apparent from the following illustrative example wherein all parts are by weight.

EXAMPLE

Several samples were prepared from a basic formulation consisting of 90.5 parts of a copolymer prepared from 85 percent by weight of vinylidene chloride and 15 percent by weight of vinyl chloride; 5 parts of ethyl phthalyl ethyl glycollate as a plasticizer, and 1.5 parts of tertiary butyl salol as a light stabilizer. One of the samples was left as a blank. To one sample was added for comparative purposes 3 parts of 1-(2-biphenyloxy)-2,3-epoxypropane, a commercially used heat stabilizer, and to the remaining samples were added 3 parts of various glycidic ester compounds some of which fall within the scope of the invention and some of which do not. The samples were all evaluated according to a standard test. In that test a sample of at least 20 grams of the formulation is subjected to a temperature of 178° C. and the pressure of the evolved hydrohalide gas is used to determine the degree of thermal degradation. The results are relative to a standard and are reported as "T" values which are the times required for the samples to reach an arbitrary rate of pressure rise. Thus, a more thermally stable composition will show a higher "T" value than a less stable composition. The results are listed in Table I.

Table I

| Stabilizer: | "T" value |
|---|---|
| Ethyl-α-ethyl-β-p-methoxyphenyl glycidate | 16 |
| Methyl-α-methyl-β-(3,4-dimethoxyphenyl) glycidate | 17 |
| Methyl-α-methyl-β-(p-tolyl) glycidate | 18 |
| Ethyl-β-(p-tolyl) glycidate | 16 |
| Methyl-α-methyl-β-(p-chlorophenyl) glycidate | 16 |
| Ethyl-α-methyl-β-methylene-3,4-dioxyphenyl glycidate | 13 |

For comparative purposes:

| | |
|---|---|
| None | 5 |
| 1-(-2-biphenyloxy-2,3-epoxypropane | 13 |
| Methyl-β-(4-cyclohexyl)cyclohexyl glycidate | 7 |
| Methyl-α-methyl-β-(4-cyclohexyl)cyclohexyl glycidate | 8 |
| Ethyl-β-methyl-β-(p-tolyl) glycidate | 5 |
| Methyl-α-methyl-β-methyl-β-phenyl glycidate | 8 |
| Methyl-α-ethyl-β-nonyl glycidate | 9 |

From the results it can be seen that the compositions employing the compounds falling outside the scope of this invention have little more stability than the unstabilized compositions. The compositions of this invention, however, are at least as stable as the composition stabilized with a commercial stabilizer.

Similar results were observed when the glycidic esters are employed as stabilizers in compositions based on the polymer and copolymers of vinyl chloride.

I claim:

1. A thermally stable composition comprising a chloroethylene polymer and stabilizing amounts of a glycidic ester having the general formula:

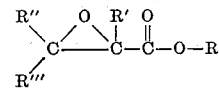

wherein R is an alkyl group having from 1 to 10 carbon atoms, R' is selected from the group consisting of hydrogen and alkyl groups having from 1 to 10 carbon atoms, R" is an aryl radical, and R''' is selected from the group consisting of hydrogen and aryl.

2. The composition claimed in claim 1 wherein said glycidic ester is present in an amount of from 0.5 to 6 percent by weight of said chloroethylene polymer.

3. The composition claimed in claim 1 wherein said chloroethylene polymer is a copolymer composed predominantly of vinylidene chloride.

4. The composition claimed in claim 1 wherein said glycidic ester is methyl - alpha - methyl - beta - (p - tolyl) glycidate.

5. The composition claimed in claim 1 wherein said glycidic ester is methyl-alpha-methyl-beta-(3,4-dimethoxyphenyl) glycidate 6. The composition claimed in claim 1 wherein said glycidic ester is ethyl-alpha-ethyl-beta-p-methoxy-phenyl glycidate.

7. The composition claimed in claim 1 wherein said glycidic ester is ethyl-beta-(p-tolyl) glycidate.

8. The composition claimed in claim 1 wherein said glycidic ester is methyl-alpha-methyl-beta-(p-chlorophenyl) glycidate.

References Cited in the file of this patent

UNITED STATES PATENTS

| 2,745,846 | Dazzi | May 15, 1956 |

FOREIGN PATENTS

| 418,230 | Great Britain | Oct. 22, 1934 |